(12) United States Patent
Tang et al.

(10) Patent No.: US 12,444,770 B2
(45) Date of Patent: Oct. 14, 2025

(54) ELECTROLYTE AND ELECTROCHEMICAL DEVICE

(71) Applicant: NINGDE AMPEREX TECHNOLOGY LIMITED, Ningde (CN)

(72) Inventors: Chao Tang, Ningde (CN); Junfei Liu, Ningde (CN); Lilan Zhang, Ningde (CN); Jianming Zheng, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 1108 days.

(21) Appl. No.: 16/962,777

(22) PCT Filed: Dec. 26, 2019

(86) PCT No.: PCT/CN2019/128852
§ 371 (c)(1),
(2) Date: Jul. 16, 2020

(87) PCT Pub. No.: WO2021/128206
PCT Pub. Date: Jul. 1, 2021

(65) Prior Publication Data
US 2021/0408595 A1   Dec. 30, 2021

(51) Int. Cl.
*H01M 10/0567* (2010.01)
*C07D 327/00* (2006.01)
(Continued)

(52) U.S. Cl.
CPC ...... *H01M 10/0567* (2013.01); *C07D 327/00* (2013.01); *H01M 4/133* (2013.01);
(Continued)

(58) Field of Classification Search
None
See application file for complete search history.

(56) References Cited

U.S. PATENT DOCUMENTS 9,755,227 B2 * 9/2017 Yu .......................... C01B 32/23
2016/0013463 A1 * 1/2016 Roumi
(Continued)

FOREIGN PATENT DOCUMENTS

CN   1877897 A    12/2006
CN   101345326 B   11/2010
(Continued)

OTHER PUBLICATIONS

Chinese First Office Action mailed Jun. 6, 2022 in counterpart Chinese application CN201980024334.3, 10 pages in Chinese.
(Continued)

*Primary Examiner* — Matthew T Martin
*Assistant Examiner* — Krishna R Hammond
(74) *Attorney, Agent, or Firm* — XSENSUS LLP

(57) ABSTRACT

An electrochemical device including a positive electrode, a negative electrode and an electrolyte, wherein the negative electrode comprises a negative electrode active material layer, including a negative electrode active material, wherein the negative electrode active material includes a silicon-containing compound; and the negative electrode active material further includes, on the surface, a protective layer including a compound having an S=O bond.

13 Claims, 1 Drawing Sheet

(51) Int. Cl.
  *H01M 4/02* (2006.01)
  *H01M 4/133* (2010.01)
  *H01M 4/36* (2006.01)
  *H01M 4/583* (2010.01)
  *H01M 10/0525* (2010.01)
  *H01M 10/0568* (2010.01)
  *H01M 10/0569* (2010.01)

(52) U.S. Cl.
  CPC ........... *H01M 4/366* (2013.01); *H01M 4/583* (2013.01); *H01M 10/0525* (2013.01); *H01M 10/0568* (2013.01); *H01M 10/0569* (2013.01); *H01M 2004/021* (2013.01); *H01M 2004/027* (2013.01); *H01M 2004/028* (2013.01)

(56) References Cited

U.S. PATENT DOCUMENTS

2019/0036118 A1* 1/2019 Ofer
2019/0386335 A1* 12/2019 Katou

FOREIGN PATENT DOCUMENTS

| CN | 104332655 A | * | 2/2015 | .......... H01M 10/052 |
|---|---|---|---|---|
| CN | 105186032 A | | 12/2015 | |
| CN | 106099171 A | | 11/2016 | |
| CN | 108183236 A | * | 6/2018 | |
| CN | 109411805 A | * | 3/2019 | .......... C07C 309/73 |
| CN | 109638254 A | | 4/2019 | |
| CN | 109768326 A | | 5/2019 | |
| JP | 2009021229 A | * | 1/2009 | ............ H01M 10/05 |
| JP | 2017117684 A | | 6/2017 | |
| JP | 2002008718 A | | 1/2020 | |
| WO | WO-2019087187 A1 | * | 5/2019 | ........ H01M 10/0525 |

OTHER PUBLICATIONS

PCT International Search Report mailed Sep. 28, 2020 in counterpart PCT application PCT/CN2019/128852, 4 pages in Chinese.
PCT Written Opinion mailed Sep. 28, 2020 in counterpart PCT application PCT/CN2019/128852, 6 pages in Chinese.

* cited by examiner

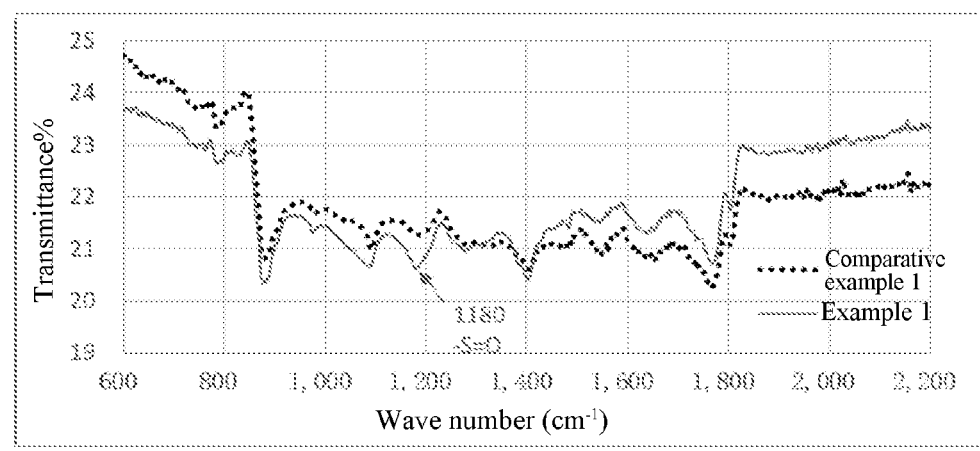

ELECTROLYTE AND ELECTROCHEMICAL DEVICE

CROSS REFERENCE TO THE RELATED APPLICATIONS

The present application is a National Stage application of PCT international application: PCT/CN2019/128852, filed on 26 Dec. 2019, the disclosure of which is hereby incorporated by reference in its entirety.

TECHNICAL FIELD

The present application relates to the technical field of energy storage technologies, and more particularly to an electrolyte and an electrochemical device containing the electrolyte.

DESCRIPTION OF RELATED ART

Lithium-ion batteries have the advantages of high energy density, high working voltage, low self-discharge rate, long cycle life, and causing no pollution, and are widely used in computers, smart wearable devices, smart phones, unmanned aerial vehicles, electric vehicles, and other fields. With the development of is modern information technology and wide use of lithium-ion batteries, higher requirements have been put forward for the battery life of lithium-ion batteries in the art.

There are many factors that affect the battery life of lithium-ion batteries. The use of silicon negative electrodes instead of traditional graphite negative electrodes is considered to be an effective means to further increase the energy density of lithium-ion batteries. However, large volume expansion of the silicon negative electrode occurs during charging and discharging processes, so that the protective layer on the surface of the silicon material is destroyed, and side reactions between the negative electrode and the electrolyte are increased, resulting in gas production and rapid decline in battery capacity. How to solve the above problems to improve the battery life of lithium-ion batteries has become an urgent problem to be solved in the field.

SUMMARY

The present application provides an electrolyte and an electrochemical device including the electrolyte. The electrolyte can form a stable protective layer on the surface of silicon negative electrode. The protective layer is not prone to production of gas upon over discharge, and can be stably attached to the silicon negative electrode, thereby suppressing side reactions of the electrolyte on the silicon negative electrode, and improving the cycle life and gas production during discharge of lithium-ion batteries with a silicon negative electrode.

In some embodiments, the present application provides an electrochemical device including a positive electrode, a negative electrode and an electrolyte, wherein
- the negative electrode includes a negative electrode active material layer, said is negative electrode active material layer includes a negative electrode active material, wherein the negative electrode active material includes a silicon-containing compound; and
- the negative electrode active material further includes, on its surface, a protective layer including a compound having an S=O bond.

In some embodiments, the electrolyte includes at least one sulfonic anhydride compound of Formula I, Formula II, or Formula III:

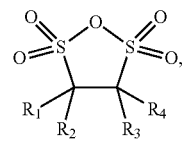

Formula I

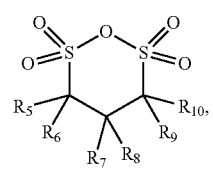

Formula II

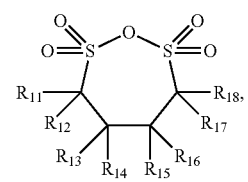

Formula III wherein $R_1$ to $R_{18}$ are each independently selected from hydrogen, halo, substituted or unsubstituted $C_1$-$C_7$ alkyl, substituted or unsubstituted $C_2$-$C_7$ alkenyl, substituted or unsubstituted $C_2$-$C_7$ alkynyl, substituted or unsubstituted $C_6$-$C_{10}$ aryl, substituted or unsubstituted $C_1$-$C_7$ alkoxy, or substituted or unsubstituted $C_6$-$C_{10}$ aryloxy; and wherein when substituted, the substituent is halo or cyano.

In some embodiments, the sulfonic anhydride compound includes at least one of:

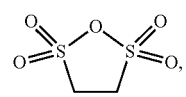

Compound 1

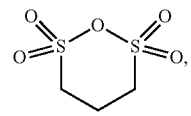

Compound 2

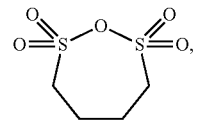

Compound 3

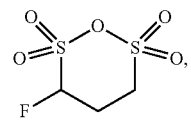

Compound 4

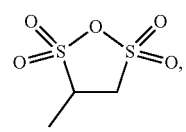

Compound 5

-continued

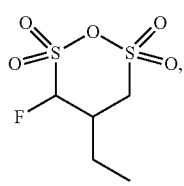
Compound 6

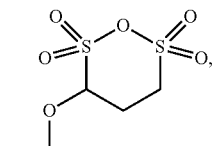
Compound 7

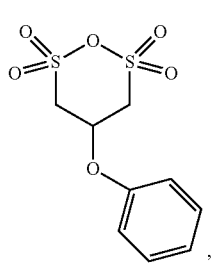
Compound 8

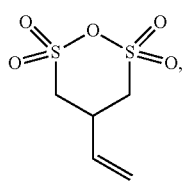
Compound 9

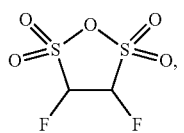
Compound 10

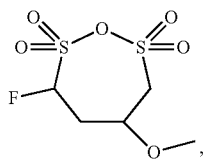
Compound 11

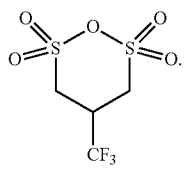
Compound 12

In some embodiments, the sulfonic anhydride compound accounts for about 0.1 wt % to about 2 wt % based on the weight of the electrolyte.

In some embodiments, the silicon-containing compound accounts for about 1 wt % to about 90 wt % based on the total weight of the negative electrode active material.

In some embodiments, the negative electrode active material layer includes carbon nanotubes. The carbon nanotubes have a tube diameter of about him to about 10 nm, and a tube length of about 1 micron to about 50 microns.

In some embodiments, the weight ratio of the silicon-containing compound to the carbon nanotubes is about 50 to about 300.

In some embodiments, the surface of the silicon-containing compound includes an oxide $Me_yO_z$, wherein $1 \leq y \leq 2$, $1 \leq Z \leq 3$, and Me is at least one selected from Ti, Al, Zr or Zn.

In some embodiments, the load of the negative electrode active material layer on the negative electrode is about 10 mg/cm$^2$ to about 30 mg/cm$^2$.

In some embodiments, the electrolyte further includes a fluorinated additive which includes at least one of the following: a fluorinated ether having 2 to 7 carbon atoms, a fluorinated carboxylate having 2 to 6 carbon atoms, or a fluorinated carbonate having 2 to 6 carbon atoms.

In some embodiments, the fluorinated additive is at least one selected from fluorinated ethyl methyl carbonate, fluorinated dimethyl carbonate, fluorinated diethyl carbonate, fluorinated ethyl propionate, fluorinated propyl propionate, fluorinated methyl propionate, fluorinated ethyl acetate, fluorinated methyl acetate, or fluorinated propyl acetate.

In some embodiments, the fluorinated additive accounts for no less than about 2 wt % based on the weight of the electrolyte.

In some embodiments, the fluorinated additive accounts for about 2 wt % to about 50 wt % based on the weight of the electrolyte.

In some embodiments, the fluorinated additive is at least one selected from:

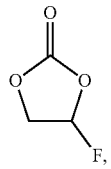
Compound 13

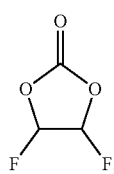
Compound 14

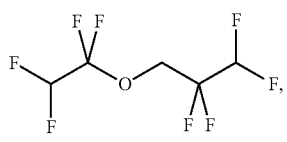
Compound 15

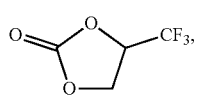
Compound 16

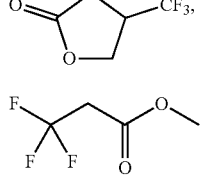
Compound 17

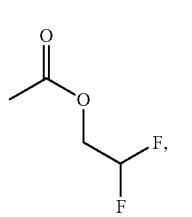
Compound 18

-continued

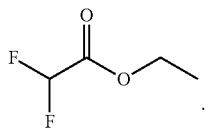

Compound 19

In some embodiments, the electrolyte further includes an additive A, wherein the additive A includes at least one of vinylene carbonate, 1,3-propane sultone, vinyl sulfate, butanedinitrile or adiponitrile.

In some embodiments, the additive A accounts for about 0.1 wt % to about 10 wt %, about 0.5 wt % to about 8 wt %, about 1 wt % to about 6 wt %, or about 2 wt % to about 4 wt % based on the weight of the electrolyte.

In some embodiments, the weight ratio P of the fluorinated additive to the sulfonic anhydride compound meets: about 1<P<about 50.

In some embodiments, the negative electrode active material further includes graphite, and the weight ratio of the graphite to the silicon-containing compound is about 95:5 to about 30:70.

In another embodiment, the present application provides an electronic device including the electrochemical device.

Additional aspects and advantages of the embodiments of the present application will be described or shown in the following description or interpreted by implementing the embodiments of the present application.

BRIEF DESCRIPTION OF DRAWINGS

FIG. 1 shows the result of infrared analysis of the negative electrode materials of lithium-ion batteries in Comparative Example 1 and Example 1.

DETAILED DESCRIPTIONS

The embodiments of the present application will be described in detail below. The embodiments of the present application should not be interpreted as limitations to the protection scope of the present application. Unless otherwise expressly indicated, the following terms used herein have the meanings indicated below.

As used herein, the term "about" is used to describe and explain minor changes. When being used in combination with an event or circumstance, the term may refer to an example in which the event or circumstance occurs precisely, and an example in which the event or circumstance occurs approximately. For example, when being used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, less than or equal to ±0.05%, or less than or equal to ±0.01%. In addition, sometimes, a quantity, a ratio, and another value are presented in a range format in the present application. It should be appreciated that such range formats are for convenience and conciseness, and should be flexibly understood as including not only values explicitly specified to range constraints, but also all individual values or sub-ranges within the ranges, like explicitly specifying each value and each sub-range.

In the detailed description and the claims, a list of items connected by the term "at least one of" may mean any one of the listed items. For example, if items A and B are listed, then the phrase "one of A and B" means only A or only B. In is another example, if items A, B, and C are listed, then the phrase "one of A, B and C" means only A; only B; or only C. The item A may include a single component or multiple components. The item B may include a single component or multiple components. The item C may include a single component or multiple components.

In the detailed description and the claims, a list of items connected by the term "at least one of" may mean any combination of the listed items. For example, if items A and B are listed, then the phrase "at least one of A and B" or "at least one of A or B" means only A; only B; or A and B. In another example, if items A, B and C are listed, then the phrase "at least one of A, B and C" or "at least one of A, B or C" means only A; or only B; only C; A and B (excluding C); A and C (excluding B); B and C (excluding A); or all of A, B and C. The item A may include a single component or multiple components. The item B may include a single component or multiple components. The item C may include a single component or multiple components.

In the specific embodiment and the claims, in the expression with reference to the number of carbon atoms, i.e. the number after the capital letter "C", such as "$C_1$-$C_{10}$", "$C_3$-$C_{10}$" or the like, the number after "C", for example, "1", "3" or "10", indicate the number of carbon atoms in a specific functional group. That is, the functional groups may include 1-10 carbon atoms and 3-10 carbon atoms, respectively. For example, "$C_1$-$C_4$ alkyl" means an alkyl group having 1-4 carbon atoms, such as $CH_3$—, $CH_3CH_2$—, $CH_3CH_2CH_2$—, $(CH_3)_2CH$—, $CH_3CH_2CH_2CH_2$—, $CH_3CH_2CH(CH_3)$—, or $(CH_3)_3C$—.

As used herein, the term "alkyl group" is intended to be a linear saturated hydrocarbon structure having 1 to 7 carbon atoms. The alkyl group is also intended to be a branched or cyclic hydrocarbon structure having 3 to 7 carbon atoms. For example, the alkyl group may be an alkyl group having 1 to 5 carbon atoms, or an alkyl group having 1 to 4 carbon atoms. When an alkyl group is having a specific number of carbon atoms is defined, it is intended to cover all geometric isomers having the carbon number. Therefore, for example, "butyl" means n-butyl, sec-butyl, isobutyl, tert-butyl and cyclobutyl; and "propyl" includes n-propyl, isopropyl and cyclopropyl. Examples of the alkyl group include, but are not limited to, methyl, ethyl, n-propyl, isopropyl, cyclopropyl, n-butyl, isobutyl, sec-butyl, tert-butyl, cyclobutyl, n-pentyl, isoamyl, neopentyl, cyclopentyl, methylcyclopentyl, ethylcyclopentyl, n-hexyl, isohexyl, cyclohexyl, n-heptyl, octyl, cyclopropyl, cyclobutyl, norbornanyl and so on. Additionally, the alkyl group can be optionally substituted.

The term "alkenyl group" refers to a monovalent unsaturated hydrocarbon group which may be straight or branched and which has at least one and usually 1, 2 or 3 carbon-carbon double bonds. Unless otherwise defined, the alkenyl group typically contains from 2 to 5 carbon atoms, for example an alkenyl group having 2 to 7 carbon atoms, or an alkenyl group having 2 to 4 carbon atoms.

Representative alkenyl groups include (for example) ethenyl, n-propenyl, iso-propenyl, n-but-2-enyl, butyl-3-enyl, n-hex-3-enyl, and the like. Additionally, the alkenyl group can be optionally substituted.

The term "alkynyl group" refers to a monovalent unsaturated hydrocarbon group which may be straight or branched and which has at least one and usually 1, 2 or 3 carbon-carbon triple bonds. Unless otherwise defined, the alkynyl group is typically an alkynyl group containing from 2 to 7, from 2 to 5, or from 2 to 4 carbon atoms. Representative alkynyl groups include (for example) ethynyl, prop-2-ynyl (n-propynyl), n-but-2-ynyl, n-hex-3-ynyl and the like. Additionally, the alkynyl group can be optionally substituted.

The term "aryl" encompasses both monocyclic and polycyclic systems. A polycyclic ring may have two or more rings wherein two carbons are shared by two adjacent rings (wherein the rings are "fused"), wherein at least one of the rings is aromatic and other rings may be for example, a cycloalkyl group, a is cycloalkenyl group, an aryl group, a heterocyclyl group and/or a heteroaryl group. For example, the aryl may contain 6 to 10 carbon atoms. Representative aryl group includes (for example) phenyl, methylphenyl, propylphenyl, isopropylphenyl, benzyl and naphthalen-1-yl, naphthalen-2-yl and the like. Additionally, the aryl group can be optionally substituted.

The term "aryloxy" means an aryl group having the stated number of carbon atoms connected by an oxygen bridge, wherein the aryl group has the meaning as defined herein. Examples include, but are not limited to, phenoxy, p-methylphenoxy, p-ethylphenoxy and the like.

As used herein, the term "alkoxy" refers to a group formed by an alkyl group connected to an oxygen atom, wherein the alkyl group has the meaning as defined herein. Representative examples of the alkoxy include, but are not limited to, methoxy, ethoxy, n-propoxy, isopropoxy, n-butoxy, sec-butoxy, tert-butoxy, pentyloxy, isopentyloxy or tert-pentyloxy, heptyloxy, octyloxy, isooctyloxy, nonyloxy, and decyloxy, etc.

As used herein, the term "halo" encompasses F, Cl, Br or I.

When the above groups are substituted, the substituent is halo or cyano.

As used herein, the content of each component in the electrolyte is based on the total weight of the electrolyte.

I. Electrolyte

In some embodiments, the electrolyte of the present application includes at least one sulfonic anhydride compound of Formula I, Formula II, or Formula III:

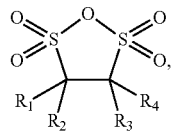

Formula I

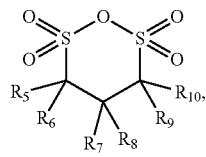

Formula II

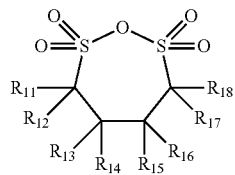

Formula III wherein $R_1$ to $R_{18}$ are each independently selected from hydrogen, halo, substituted or unsubstituted $C_1$-$C_7$ alkyl, substituted or unsubstituted $C_2$-$C_7$ alkenyl, substituted or unsubstituted $C_2$-$C_7$ alkynyl, substituted or unsubstituted is $C_6$-$C_{10}$ aryl, substituted or unsubstituted $C_1$-$C_7$ alkoxy, or substituted or unsubstituted $C_6$-$C_{10}$ aryloxy, wherein when substituted, the substituent is halo or cyano.

In some embodiments, $R_1$ to $R_{18}$ are each independently selected from hydrogen, halo, substituted or unsubstituted $C_1$-$C_4$ alkyl, substituted or unsubstituted $C_2$-$C_4$ alkenyl, substituted or unsubstituted $C_2$-$C_4$ alkynyl, substituted or unsubstituted $C_6$-$C_{10}$ aryl, substituted or unsubstituted $C_1$-$C_4$ alkoxy, or substituted or unsubstituted $C_6$-$C_{10}$ aryloxy, wherein when substituted, the substituent is halo or cyano.

In some embodiments, $R_1$ to $R_{18}$ are each independently selected from H, F, methyl, difluoromethyl, trifluoromethyl, ethyl, propyl, ethenyl, 1-propenyl, 2-propenyl, 1-propynyl, 2-propynyl, methoxy, ethoxy or phenoxy.

In some embodiments, the sulfonic anhydride compound includes at least one of:

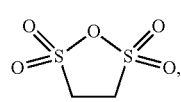

Compound 1

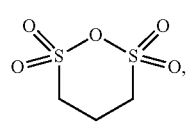

Compound 2

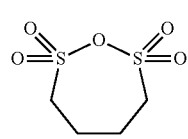

Compound 3

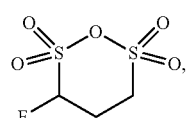

Compound 4

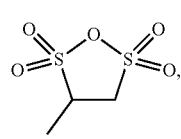

Compound 5

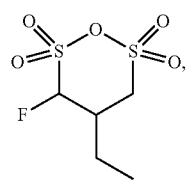

Compound 6

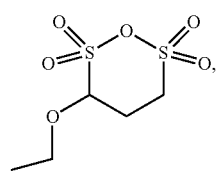

Compound 7

-continued

Compound 8

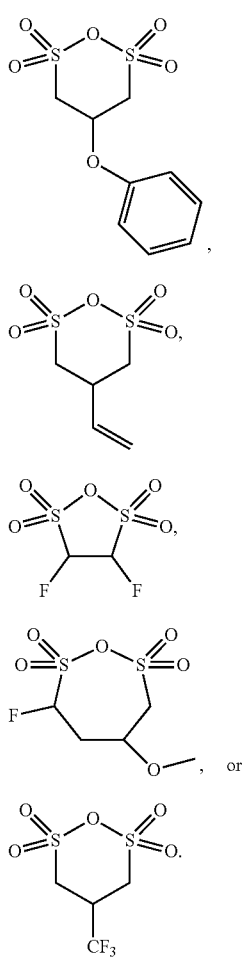

Compound 9

Compound 10

Compound 11

Compound 12

In some embodiments, the sulfonic anhydride compound accounts for about 0.1 wt % to about 3 wt %, about 0.2 wt % to about 2 wt %, about 0.3 wt % to about 1.5 wt %, or about 0.5 wt % to about 1 wt % based on the weight of the electrolyte.

In some embodiments, the electrolyte further includes a fluorinated additive, which includes at least one of a fluorinated ether having 2 to 7 carbon atoms, a fluorinated carboxylate having 2 to 6 carbon atoms, or a fluorinated carbonate having 2 to 6 carbon atoms. In some embodiments, the fluorinated additive is at least one selected from fluorinated ethyl methyl carbonate, fluorinated dimethyl carbonate, fluorinated diethyl carbonate, fluorinated ethyl propionate, fluorinated propyl propionate, fluorinated methyl propionate, fluorinated ethyl acetate, fluorinated methyl acetate, or fluorinated propyl acetate.

In some embodiments, the fluorinated additive is at least one selected from:

Compound 13

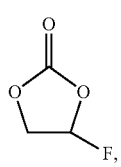

Compound 14

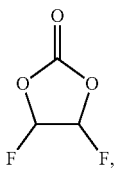

Compound 15

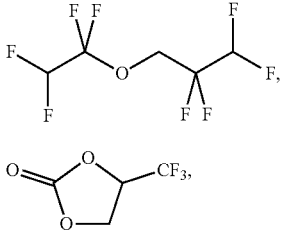

Compound 16

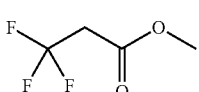

Compound 17

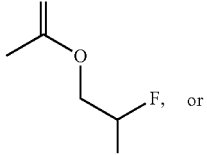

Compound 18

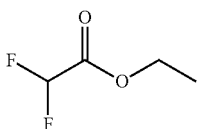

Compound 19

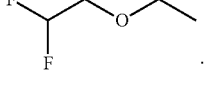

In some embodiments, the weight ratio P of the fluorinated additive to the sulfonic anhydride compound is about 1 to about 50, about 5 to about 40 or about 10 to about 30.

In some embodiments, the fluorinated additive accounts for no less than about 5 wt % based on the weight of the electrolyte.

In some embodiments, the fluorinated additive accounts for 5 wt % to about 50 wt %, about 5.5 wt % to about 40 wt %, about 6 wt % to about 30 wt %, about 6.5 wt % to about 20 wt %, or 7 wt % to about 10 wt % based on the weight of the electrolyte. In some embodiments, the electrolyte further includes an additive A, wherein the additive A includes at least one of vinylene carbonate (VC), 1,3-propane sultone (PS), ethylene sulfate (DTD), butanedinitrile (BDN) or adiponitrile (ADN).

In some embodiments, the vinylene carbonate accounts for no more than about 2 wt % based on the weight of the electrolyte.

In some embodiments, the adiponitrile accounts for about 0.5 wt % to about 5 wt % based on the weight of the electrolyte.

In some embodiments, the butanedinitrile accounts for about 0.5 wt % to about 5 wt % based on the weight of the electrolyte.

In some embodiments, the additive A accounts for about 0.1 wt % to about 10 wt % based on the weight of the electrolyte.

In some embodiments, the electrolyte further includes a lithium salt and an organic solvent.

In some embodiments, the lithium salt is one or more selected from an inorganic lithium salt and an organic lithium salt. In some embodiments, the lithium salt includes at least one of a fluorine element, a boron element, and a phosphorus element. In some embodiments, the lithium salt is one or more selected from lithium hexafluorophosphate $LiPF_6$, lithium bis(trifluoromethanesulphonyl)imide $LiN(CF_3SO_2)_2$ (LiTFSI), lithium bis(fluorosulfonyl)imide $Li(N(SO_2F)_2$(LiFSI), lithium bis(oxalato)borate $LiB(C_2O_4)_2$ (LiBOB), lithium difluoro(oxalato)borate $LiBF_2(C_2O_4$ (LiDFOB), lithium hexafluoroarsenate ($LiAsF_6$), lithium perchlorate ($LiClO_4$), and lithium trifluoromethanesulfonate ($LiCF_3SO_3$).

In some embodiments, the content of the lithium salt is about 0.5 mol/L to about 2 mol/L. In some embodiments, the content of the lithium salt is about 0.8 mol/L to about 1.5 mol/L. In some embodiments, the content of the lithium salt is about 1 mol/L to about 1.2 mol/L. In some embodiments, the content of the lithium salt is about 1.05 mol/L.

The organic solvent includes a cyclic ester and a chain ester. The cyclic ester is at least one selected from ethylene carbonate (EC), propylene carbonate (PC), γ-butyrolactone (BL), and butylene carbonate. The chain ester is at least one selected from dimethyl carbonate (DMC), diethyl carbonate (DEC), ethyl methyl carbonate (EMC), propyl ethyl carbonate, methyl formate (MF), ethyl formate (EF), ethyl acetate (EA), ethyl propionate (EP), propyl propionate (PP), methyl propionate, methyl butyrate, and ethyl butyrate.

In some embodiments, the organic solvent accounts for about 40 to about 60 wt % based on the weight of the electrolyte.

II. Electrochemical Device

The electrochemical device of the present application includes any device wherein an electrochemical reaction takes place, and specific examples include all kinds of primary batteries, secondary batteries, fuel cells, solar cells, or capacitors. In particular, the electrochemical device is a lithium secondary battery including a lithium metal secondary battery, a lithium-ion secondary battery, a lithium polymer secondary battery or a lithium-ion polymer secondary battery. In some embodiments, the electrochemical device of the present application is an electrochemical device having a positive electrode having a positive electrode active material capable of absorbing and releasing metal ions; a negative electrode having a negative electrode active material capable of absorbing and releasing metal ions, and characterized by including any electrolyte of the present application.

Electrolyte

The electrolyte used in the electrochemical device of the present application is any of the aforementioned electrolytes according to the present application. Moreover, the electrolyte used in the electrochemical device of the present application may include other electrolytes falling within the scope of present application.

Negative Electrode

The material and structure of the negative electrode used in the electrochemical device of the present application, and the manufacturing method therefor include any of the techniques concerning silicon-containing negative electrodes disclosed in the prior art.

In some embodiments, the negative electrode includes a current collector and a negative electrode active material layer on the current collector, wherein the negative electrode active material layer includes a negative electrode active material; and the negative electrode active material includes a silicon-containing compound, and the negative electrode active material further includes, on the surface, a protective layer including a compound having an S=O bond.

In some embodiments, in addition to the silicon-containing compound, the negative electrode active material may further include any negative electrode material selected from graphite, hard carbon, mesophase carbon microspheres, and the like, which can achieve lithium deintercalation and intercalation.

In some embodiments, the silicon-containing compound is the silicon compound $SiO_x$ (0.5<x<1.5), elemental silicon, or a mixture of thereof.

In some embodiments, the surface of the silicon-containing compound includes $Me_yO_z$, wherein 1≤y≤2, 1≤Z≤3, and Me is selected from Ti, Al, Zr or Zn. In some embodiments, th metal oxide $Me_yO_z$ on the surface of the silicon material may be at least one of $TiO_2$, $Al_2O_3$, $ZrO_2$, and ZnO.

In some embodiments, the metal oxide $Me_yO_z$ has a thickness of about 5 nm to about 100 nm, about 10 nm to about 80 nm, about 20 nm to about 60 nm or about 30 nm to about 50 nm. If the metal oxide is too thick, the electronic conductivity on the surface of the material is poor, which will cause a large negative electrode resistance, and is not conducive to the formation of a is protective layer by the electrolyte additive on the surface of the silicon material. If the metal oxide is too thin, an effective protective layer cannot be formed.

In some embodiments, based on the total weight of the negative electrode active material, the silicon-containing negative electrode active material accounts for about 1 wt % to about 90 wt %, about 5 wt % to about 80 wt %, about 10 wt % to about 70 wt %, about 15 wt % to about 60 wt %, about 20 wt % to about 50 wt %, or about 30 wt % to about 40 wt %.

In some embodiments, the negative electrode active material further includes carbon nanotubes. The carbon nanotubes have a tube diameter of about 1 nm to about 10 nm, and a tube length of about 1 micron to about 50 microns.

In some embodiments, the weight ratio of the silicon-containing compound to the carbon nanotubes is about 50 to about 300, about 100 to about 250, or about 150 to about 200.

In some embodiments, the load of the negative electrode active material on the negative electrode is about 10 mg/cm$^2$ to about 30 mg/cm$^2$, about 12 mg/cm$^2$ to about 25 mg/cm$^2$, or about 16 mg/cm$^2$ to about 20 mg/cm$^2$.

In some embodiments, the negative electrode active material further includes a binder, and optionally a conductive material. The binder increases the binding of the negative electrode active material particles to each other and the binding of the negative electrode active material to the current collector. In some embodiments, the binder includes, but is not limited to, polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(1,1-vinylidene fluoride), polyethylene, polypropylene, styrene butadiene rubber, acrylated styrene butadiene rubber, epoxy resins, Nylon and so on.

In some embodiments, the conductive material includes, but is not limited to, a carbon based material, a metal based material, a conductive polymer, or a mixture thereof. In some embodiments, the carbon-based material is selected from natural graphite, artificial graphite, carbon black, acetylene black, ketjen black, carbon fiber, or any combinations thereof. In some embodiments, the metal based material is selected from metal powders, metal fibers, copper, nickel, aluminum, and silver. In some embodiments, the conductive polymer is a polyphenylene derivative.

In some embodiments, the current collector include, but is not limited to, copper foil, nickel foil, stainless steel foil, titanium foil, foamed nickel, foamed copper, polymeric substrates coated with a conductive metal, and any combinations thereof.

The negative electrode can be produced by methods known in the art. For example, the negative electrode can be obtained by mixing an active material, a conductive material and a binder in a solvent to prepare an active material composition, and coating the active material composition on a current collector. In some embodiments, the solvent may include, but is not limited to, water.

Positive Electrode

The positive electrode material used in the electrochemical device of the present application can be prepared using materials, construction and manufacturing methods well known in the art. In some embodiments, the positive electrode of the present application can be prepared using the technique described in U.S. Pat. No. 9,812,739B, which is incorporated herein by reference in its entirety.

In some embodiments, the positive electrode includes a current collector and a positive electrode active material layer on the current collector. The positive electrode active material includes at least one lithiated intercalation compound that reversibly intercalates and deintercalates lithium-ions. In some is embodiments, the positive electrode active material includes a composite oxide. In some embodiments, the composite oxide contains lithium and at least one element selected from the group consisting of cobalt, manganese, and nickel.

In some embodiments, the positive electrode active material is one or more selected from lithium cobalt oxide, lithium manganese oxide, lithium nickel oxide, or a lithium nickel manganese cobalt ternary material. The negative electrode active material includes silicon or a silicon-oxygen material, and may also be any negative electrode material selected from graphite, hard carbon, mesophase carbon microspheres, and others that can achieve lithium deintercalation and intercalation.

In some embodiments, the positive electrode active material may have a coating on its surface or may be mixed with another compound having a coating. The coating may include at least one coating element compound selected from the group consisting of an oxide of a coating element, a hydroxide of a coating element, an oxyhydroxide of a coating element, an oxycarbonate of a coating element, and a hydroxycarbonate of a coating element. The compound used for the coating may be amorphous or crystalline.

In some embodiments, the coating element contained in the coating may include Mg, Al, Co, K, Na, Ca, Si, Ti, V, Sn, Ge, Ga, B, As, Zr or any combinations thereof. The coating can be applied by any method as long as the method does not adversely affect the performance of the positive electrode active material. For example, the method may include any coating method known in the art, such as spraying, dipping, and others.

The positive electrode active material layer further includes a binder, and optionally a conductive material. The binder increases the binding of the positive electrode active material particles to each other and the binding of the positive electrode active material to the current collector.

In some embodiments, the binder includes, but is not limited to, polyvinyl alcohol, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(1,1-vinylidene fluoride), polyethylene, polypropylene, styrene butadiene rubber, acrylated styrene butadiene rubber, epoxy resins, Nylon and so on.

In some embodiments, the conductive material includes, but is not limited to, a carbon based material, a metal based material, a conductive polymer, and a mixture thereof. In some embodiments, the carbon-based material is selected from natural graphite, artificial graphite, carbon black, acetylene black, ketjen black, carbon fiber, or any combinations thereof. In some embodiments, the metal based material is selected from metal powders, metal fibers, copper, nickel, aluminum, and silver. In some embodiments, the conductive polymer is a polyphenylene derivative.

In some embodiments, the current collector may be, but is not limited to, aluminum.

The positive electrode can be prepared by a preparation method well known in the art. For example, the positive electrode can be obtained by mixing an active material, a conductive material and a binder in a solvent to prepare an active material composition, and coating the active material composition on a current collector. In some embodiments, the solvent may include, but is not limited to, N-methylpyrrolidone or the like.

In some embodiments, the positive electrode is prepared by forming a positive electrode material with a positive electrode active material layer including a lithium-transition metal compound powder and a binder on a current collector.

In some embodiments, the positive electrode active material layer can generally be produced by dry mixing a positive electrode material and a binder (and a is conductive material and a thickener if needed) to form flakes, and pressing the obtained flakes on a positive electrode current collector; or dissolving or dispersing the material in a liquid medium to form a slurry, coating the slurry on a positive electrode current collector, and drying. In some embodiments, the material of the positive electrode active material layer includes any material known in the art.

Separator Film

In some embodiments, the electrochemical device of the present application is provided with a separator film between the positive electrode and the negative electrode to prevent short circuit. The material and shape of the separator film used in the electrochemical device of the present application are not particularly limited, and may be any of the techniques disclosed in the prior art. In some embodiments, the separator film includes a polymer or an inorganic substance or the like formed of a material which is stable against the electrolyte of the present application.

For example, the separator film may include a substrate layer and a surface treatment layer. The substrate layer is a non-woven fabric, film, or composite film having a porous structure, and the material of the substrate layer is at least one selected from the group consisting of polyethylene, polypropylene, polyethylene terephthalate, and polyimide. Particularly, a porous polypropylene film, a porous polyethylene film, a polypropylene nonwoven fabric, a polyethylene nonwoven fabric, and a porous polypropylene-polyethylene-polypropylene composite film may be used. One or more substrate layers may be present. When more than one substrate layers are present, the polymers in different substrate layers may have the same or different composition(s), and the weight average molecular weights are different.

When more than one substrate layers are present, the shutdown temperature of the polymers in is different substrate layers is different.

At least one surface of the substrate layer is provided with a surface treatment layer, which may be a polymer layer or an inorganic layer, or a layer formed by mixing a polymer and an inorganic material.

The inorganic layer includes inorganic particles and a binder. The inorganic particles are at least one selected from the group consisting of alumina, silica, magnesia, titania, hafnium dioxide, tin oxide, cerium dioxide, nickel oxide, zinc oxide, calcium oxide, zirconia, yttria, silicon carbide, eboehmite, aluminum hydroxide, magnesium hydroxide, calcium hydroxide and barium sulfate, or a combination of more than one thereof. The binder is one selected from the group consisting of a polyvinylidene fluoride, a copolymer of vinylidene fluoride-hexafluoropropylene, a polyamide, a polyacrylonitrile, a polyacrylate ester, a polyacrylic acid, a polyacrylate salt, a polyvinylpyrrolidone, a polyvinyl ether, a polymethyl methacrylate, polytetrafluoroethylene, and polyhexafluoropropylene, or a combination of more than one thereof. The polymer layer contains a polymer, and the polymer includes at least one of a polyamide, a polyacrylonitrile, a polyacrylate ester, a polyacrylic acid, a polyacrylate salt, a polyvinylpyrrolidone, a polyvinyl ether, a polyvinylidene fluoride or a poly(vinylidene fluoride-hexafluoropropylene).

III. Application

The electrolyte according to the embodiments of the present application can be used to improve cycle performance and high-temperature stability under over-discharge conditions of batteries, thus it is applicable to an electronic device including an electrochemical device.

The use of the electrochemical device according to the present application is not particularly limited, and can be used in various known applications, such as notebook computers, pen-input computers, mobile computers, e-book players, portable phones, portable fax machines, portable copiers, portable printers, is head-mounted stereo headphones, video recorders, LCD TVs, portable cleaners, portable CD players, Mini discs, transceivers, electronic notebooks, calculators, memory cards, portable recorders, radios, backup power sources, motors, vehicles, motorcycles, scooters, bicycles, lighting apparatus, toys, game consoles, clocks, electric tools, flashing light, cameras, large batteries for household use, or lithium-ion capacitors.

EXAMPLES

Hereinafter, the present application will be specifically described by way of examples and comparative examples; however, the present application is not limited thereto as long as they do not deviate from the spirit of the present application.

I. Preparation of Lithium-Ion Battery (1) Preparation of Negative Electrode:

3.6 kg of sodium carboxymethyl cellulose (CMC) solution (which is a thickener, 1.5 wt %), 0.3 kg of styrene-butadiene rubber emulsion (which is a binder, 50 wt %), 6.0 kg of graphite powder (which is a negative electrode active material), 1.2 kg of SiO negative electrode active material coated with a metal oxide (the composition and thickness of the coating are shown in Table 1), 0.012 kg of carbon nanotubes (with a tube diameter of about him to about 5 nm, and a tube length of about 1 micron to about 30 micron) were weighed. These materials were fully mixed and stirred to obtain a negative electrode slurry. The negative electrode slurry was evenly coated on a 8-micron-thick copper foil that acts as the current collector of negative electrode, and then baked at 120° C. for 1 hour. The load of the negative electrode active material is about 15 mg/cm$^2$. After compaction and cutting, a negative electrode was obtained. The prepared negative electrode active material layer has a capacity per gram of about 0.55 Ah/g.

(2) Preparation of Positive Electrode 2.8 kg of N-methyl-2-pyrrolidone (NMP) (which is a solvent), 2.4 kg of polyvinylidene fluoride (PVDF) (which is a binder, 10 wt %), 0.32 kg of conductive graphite (which is a conductive agent), and 14.4 kg of LiCoO$_2$ (which is the positive electrode active material) were weighted, fully mixed and stirred to obtain a positive electrode slurry. The positive electrode slurry was then evenly coated on a 10 micron-thick aluminum foil that is a positive electrode current collector, then baked at 120° C. for 1 hour to obtain a positive electrode. After compaction and cutting, the positive electrode was obtained.

(3) Preparation of Electrolyte

In a glove box under a dry argon atmosphere, ethylene carbonate (EC), propylene carbonate (PC), and diethyl carbonate (DEC) were weighed and mixed at a weight ratio of 20:10:70. Then LiPF$_6$ was added as a lithium salt.

Particular types and amounts of additives were added (the types and amounts of added substances are shown in Table 1). The concentration of LiPF$_6$ in the electrolyte was 1.05 mol/L.

(4) Preparation of Separator Film

A 9-micron-thick polypropylene separator film was used.

(5) Preparation of Lithium-Ion Battery

The positive electrode, the separator film, and the negative electrode were positioned in order such that the separator film was placed between the positive electrode and the negative electrode, then wound, placed in an aluminum foil packaging bag, and baked at 80° C. to remove water. The electrolyte was injected. After sealing, formation, venting, and capacity test, a lithium-ion secondary battery was obtained.

Example 1 to Example 20, and Comparative Examples 1 and 2

The electrolytes and lithium-ion batteries of Example 1 to Example 20 and is Comparative Example 1 and Comparative Example 2 were prepared following the methods as described in (1) to (5) above.

Example 21

The electrolyte and lithium-ion battery of Example 21 were prepared, wherein the negative electrode was prepared following the method described below, and the others were prepared according to the methods as described in (2) to (5) above.

3.6 kg of sodium carboxymethyl cellulose (CMC) solution (which is a thickener, 1.5 wt %), 0.3 kg of styrene-butadiene rubber emulsion (which is a binder, 50 wt %), 6.0 kg of a graphite powder (which is a negative electrode active material), 1.2 kg of SiO negative electrode active material coated with a metal oxide (wherein the composition and thickness of the coating are shown in Table 1) were weighed. The materials were fully mixed and stirred to obtain a negative electrode slurry. The negative electrode slurry was then evenly coated on a 8-micron-thick copper foil acting as current collector of negative electrode, and then baked at 120° C. for 1 hour. The load of the negative electrode active material is about 15 mg/cm². After compaction and cutting, a negative electrode was obtained.

Example 22

The electrolyte and lithium-ion battery of Example 22 were prepared, wherein the negative electrode was prepared following the method described below, and the others were prepared according to the methods as described in (2) to (5) above.

3.6 kg of sodium carboxymethyl cellulose (CMC) solution (which is a thickener, 1.5 wt %), 0.3 kg of styrene-butadiene rubber emulsion (which is a binder, 50 wt %), 6.0 kg of a graphite powder (which is a negative electrode active is material), 1.2 kg of silicon-oxygen negative electrode active material SiO without a metal oxide coating, 0.012 kg of carbon nanotubes (with a tube diameter of about 1 nm to about 5 nm, and a tube length of about 1 micron to about 30 microns) were weighed. The materials were fully mixed and stirred to obtain a negative electrode slurry. The negative electrode slurry was then evenly coated on a 8-micron-thick copper foil acting as current collector of negative electrode, and then baked at 120° C. for 1 hour. The load of the negative electrode active material is about 15 mg/cm². After compaction and cutting, a negative electrode was obtained.

and then discharged at a constant current of 0.5C to a voltage of 3.0V. This was a charge-discharge cycle. The corresponding discharge capacity was recorded as a first discharge capacity of the lithium-ion battery. The lithium-ion battery was amenable to 500 charge-and-discharge cycles as described above, and the discharge capacity at the $N^{th}$ cycle was detected.

Capacity retention rate (%) of the lithium-ion battery after N cycles=discharge capacity of the $N^{th}$ cycle/the first discharge capacity×100%.

Three batteries were tested for each example, and the average value thereof was taken.

(2) Storage Performance Test of Lithium-Ion Battery Upon Over Discharge

At 25° C., the lithium-ion secondary battery was charged at a constant current of 0.5 C to a voltage of 4.45V, then charged at a constant voltage of 4.45V until the current is 0.05 C, allowed to stand for 5 minutes, then discharged at a constant current of 0.5C to a voltage of 3.0V, and then discharged at a constant current of 0.05C to a voltage of 1.5V. The discharged battery was placed in an oven at 60° C., the thickness of the soft-pack battery was tested every 3 days, and the thickness expansion rate of the lithium-ion secondary battery was recorded. Three batteries were tested for each example, and their average value was taken.

TABLE 1

Examples and Comparative examples

| Examples | Additive, wt % | | | | | | | | | Coating material on Si-O negative electrode | Thickness of coating, (nm) | Carbon nanotube conductive agent |
|---|---|---|---|---|---|---|---|---|---|---|---|---|
| | Compd. 2 | Compd. 4 | Compd. 5 | Compd. 7 | Compd. 12 | Compd. 13 | Compd. 15 | Compd. 19 | Adiponitrile | | | |
| Example 1 | 0.5 | / | / | / | / | / | / | / | 1 | Al₂O₃ | 20 | Y |
| Example 2 | 0.5 | / | / | / | / | 5 | / | / | 1 | Al₂O₃ | 20 | Y |
| Example 3 | 0.2 | / | / | / | / | 5 | / | / | 1 | Al₂O₃ | 20 | Y |
| Example 4 | 1 | / | / | / | / | 5 | / | / | 1 | Al₂O₃ | 20 | Y |
| Example 5 | 2 | / | / | / | / | 5 | / | / | 1 | Al₂O₃ | 20 | Y |
| Example 6 | 0.5 | / | / | / | / | 5 | / | / | / | Al₂O₃ | 20 | Y |
| Example 7 | / | 1 | / | / | / | 5 | / | / | 1 | Al₂O₃ | 20 | Y |
| Example 8 | / | / | 1 | / | / | 5 | / | / | 1 | Al₂O₃ | 20 | Y |
| Example 9 | / | / | / | 1 | / | 5 | / | / | 1 | Al₂O₃ | 20 | Y |
| Example 10 | / | / | / | / | 1 | 5 | / | / | 1 | Al₂O₃ | 20 | Y |
| Example 11 | 0.5 | / | / | / | / | 10 | / | / | 1 | Al₂O₃ | 20 | Y |
| Example 12 | 0.5 | / | / | / | / | / | 5 | / | 1 | Al₂O₃ | 20 | Y |
| Example 13 | 0.5 | / | / | / | / | / | 10 | / | 1 | Al₂O₃ | 20 | Y |
| Example 14 | 0.5 | / | / | / | / | / | / | 5 | 1 | Al₂O₃ | 20 | Y |
| Example 15 | 0.5 | / | / | / | / | 5 | 5 | / | 1 | Al₂O₃ | 20 | Y |
| Example 16 | 0.5 | / | / | / | / | 5 | / | / | 1 | Al₂O₃ | 10 | Y |
| Example 17 | 0.5 | / | / | / | / | 5 | / | / | 1 | Al₂O₃ | 30 | Y |
| Example 18 | 0.5 | / | / | / | / | 5 | / | / | 1 | Al₂O₃ | 50 | Y |
| Example 19 | 0.5 | / | / | / | / | 5 | / | / | 1 | Al₂O₃ | 80 | Y |
| Example 20 | 0.5 | / | / | / | / | 5 | / | / | 1 | TiO2 | 20 | Y |
| Example 21 | 0.5 | / | / | / | / | 5 | / | / | 1 | Al₂O₃ | 20 | N |
| Example 22 | 0.5 | / | / | / | / | 5 | / | / | 1 | No coating | 20 | Y |
| Comparative Example 1 | / | / | / | / | / | / | / | / | 1 | Al₂O₃ | 20 | Y |
| Comparative Example 2 | / | / | / | / | / | 5 | / | / | 1 | Al₂O₃ | 20 | Y |

"/" denotes that the substance is not present.

2. Test of Lithium-Ion Battery (1) Cycle Performance Test of Lithium-Ion Battery At 25° C., a lithium-ion battery was allowed to stand for 30 minutes, charged at a constant current of 0.5 C to a voltage of 4.45V, then charged at a constant voltage of 4.45V until the current is 0.05 C, allowed to stand for 5 minutes, Thickness expansion rate (%) of lithium-ion battery after storage for X days=(battery thickness on the $X^{th}$ day after storage/battery thickness after over discharge−1)×100%.

(3) Infrared Analysis of Negative Electrode Surface of Lithium-Ion Batteries

The prepared battery was discharged to 3.0V at 0.5C and then discharged to 2.5v at 0.05C. The battery was disassembled. A powder was scraped from the negative electrode active material layer and then compressed for infrared analysis.

A. The electrolytes and lithium-ion batteries of Example 1 to Example 22 and Comparative Examples 1 to 2 were prepared following the methods as described above. The cycling capacity retention rates after various cycles and the thickness expansion rate during storage at 60° C. after discharge to 1.5V of the lithium-ion batteries were tested. The test results are shown in Table 2.

TABLE 2

Capacity retention rate of batteries after various cycles

| Examples | Capacity retention rate after various cycles, % | | | | |
|---|---|---|---|---|---|
| | 100 cycles | 200 cycles | 300 cycles | 400 cycles | 500 cycles |
| Example 1 | 96.33 | 92.75 | 87.55 | 82.68 | 78.42 |
| Example 2 | 96.38 | 93.27 | 89.52 | 85.16 | 82.46 |
| Example 3 | 95.47 | 91.84 | 88.02 | 83.63 | 81.39 |
| Example 4 | 96.72 | 93.51 | 89.88 | 85.75 | 82.93 |
| Example 5 | 95.73 | 92.84 | 88.35 | 84.15 | 81.22 |
| Example 6 | 95.28 | 92.18 | 88.43 | 83.07 | 80.38 |
| Example 7 | 96.43 | 93.27 | 89.13 | 84.35 | 82.05 |
| Example 8 | 96.52 | 93.30 | 89.22 | 84.47 | 82.33 |
| Example 9 | 95.88 | 92.84 | 88.46 | 83.94 | 81.59 |
| Example 10 | 96.62 | 93.45 | 89.36 | 85.29 | 82.56 |
| Example 11 | 96.80 | 93.71 | 89.98 | 85.65 | 82.97 |
| Example 12 | 96.34 | 93.20 | 89.42 | 85.01 | 82.28 |
| Example 13 | 96.65 | 93.41 | 89.53 | 85.34 | 82.62 |
| Example 14 | 96.86 | 93.73 | 89.96 | 84.58 | 81.37 |
| Example 15 | 96.87 | 94.05 | 90.27 | 86.42 | 83.58 |
| Example 16 | 95.21 | 92.10 | 87.36 | 83.01 | 80.31 |
| Example 17 | 96.83 | 93.62 | 89.87 | 85.69 | 82.78 |
| Example 18 | 96.52 | 93.41 | 89.65 | 85.29 | 82.58 |
| Example 19 | 95.18 | 92.10 | 88.40 | 84.10 | 81.43 |
| Example 20 | 95.13 | 92.06 | 88.36 | 84.05 | 81.39 |
| Example 21 | 95.90 | 91.80 | 87.07 | 82.73 | 80.05 |
| Example 22 | 94.80 | 89.22 | 84.74 | 81.64 | 77.21 |
| Comparative Example 1 | 93.46 | 86.37 | 78.22 | 68.83 | 58.49 |
| Comparative Example 2 | 93.84 | 87.89 | 80.20 | 71.92 | 62.26 |

TABLE 3

Thickness expansion rate of batteries upon storage at 60° C. after discharge to 1.5V

| Examples | Thickness expansion rate of batteries upon storage at 60° C. after discharge to 1.5V, % | | | | |
|---|---|---|---|---|---|
| | 3 days | 6 days | 9 days | 12 days | 15 days |
| Example 1 | 3.05 | 3.66 | 4.03 | 4.62 | 6.74 |
| Example 2 | 3.22 | 4.15 | 4.36 | 5.82 | 8.55 |
| Example 3 | 3.54 | 4.67 | 5.08 | 6.94 | 10.42 |
| Example 4 | 3.03 | 3.47 | 3.85 | 4.89 | 5.44 |
| Example 5 | 2.75 | 3.11 | 3.38 | 4.2 | 4.86 |
| Example 6 | 3.32 | 4.27 | 4.49 | 5.99 | 8.81 |
| Example 7 | 3.06 | 3.53 | 4.07 | 5.13 | 6.04 |
| Example 8 | 3.10 | 3.62 | 4.15 | 5.32 | 6.32 |
| Example 9 | 3.07 | 3.58 | 4.10 | 5.22 | 6.13 |
| Example 10 | 3.03 | 3.38 | 3.75 | 4.68 | 5.38 |
| Example 11 | 3.22 | 4.36 | 4.68 | 6.32 | 9.18 |
| Example 12 | 3.33 | 4.30 | 4.51 | 6.02 | 9.85 |
| Example 13 | 3.43 | 4.42 | 4.65 | 6.20 | 10.14 |
| Example 14 | 3.26 | 4.20 | 4.42 | 5.89 | 9.64 |
| Example 15 | 3.19 | 4.25 | 4.48 | 6.23 | 8.74 |
| Example 16 | 3.41 | 4.40 | 4.62 | 6.17 | 10.06 |
| Example 17 | 3.14 | 4.04 | 4.22 | 4.64 | 7.25 |
| Example 18 | 3.06 | 3.94 | 4.14 | 4.53 | 6.12 |
| Example 19 | 2.94 | 3.78 | 3.98 | 4.31 | 5.80 |
| Example 20 | 3.45 | 4.36 | 4.77 | 6.36 | 9.29 |
| Example 21 | 3.56 | 4.49 | 5.40 | 6.86 | 9.59 |
| Example 22 | 3.36 | 4.53 | 4.93 | 6.28 | 8.41 |
| Comparative Example 1 | 5.05 | 7.82 | 14.47 | 27.65 | 48.69 |
| Comparative Example 2 | 5.49 | 8.50 | 15.73 | 33.31 | 57.27 |

According to the test results of Example 1 and Comparative Example 1, it can be seen that for batteries with a silicon-oxygen negative electrode coated with a metal oxide (e.g. $Al_2O_3$) protective layer, addition of a sulfonic anhydride compound (for example, Compound 2) to the electrolyte can significantly improve the cycling capacity retention rate, and can significantly inhibit the gas production of batteries when discharged to 1.5V. Infrared analysis of the negative electrode surface of the batteries from Example 1 and Comparative Example 1 (see FIG. 1) shows that the negative electrode active material of Example 1 includes, on the surface, a protective layer including a compound having an S=O bond. Infrared analysis of the negative electrode surface of the batteries from Example 2 to Example 22 also confirms that the negative electrode active material includes, on the surface, a protective layer including a compound having an S=O bond. Without wishing to be bound by theory, the above performance improvement may be because the cyclic sulfonic anhydride compound forms an effective protective layer on the negative electrode. The protective layer has good adhesion to the coating layer on the silicon surface and can significantly inhibit capacity decline. When the content of the sulfonic anhydride compound (e.g. Compound 2) is too low, it is insufficient to form good protection. If the content is too high, the resistance of the formed protective layer will be too large, which is not conducive to the deintercalation is and intercalation of lithium-ions. In view of these factors, the improvement is particularly notable when the amount of the sulfonic anhydride compound added is 0.5 wt % to 2 wt %.

According to the test results of Example 4 and Examples 7 to 10, it can be seen that when each example of the sulfonic anhydride compound (such as Compound 2, 4, 5, 7 or 12) is added to the electrolyte, similar technical effects can be obtained.

According to the test results of Example 1 and Examples 2, 12 and 14, it can be seen that further addition of an appropriate amount of a fluorinated additive (such as Compounds 13, 15 and 19) to the electrolyte can further improve the cycle performance of the lithium-ion battery with a silicon-containing negative electrode, but the post-cycle high-temperature resistance is slightly reduced. This may be because the fluorinated additives are easy to form an organic protective layer on the surface of silicon, which can significantly improve the cycling capacity retention rate; however, the high-temperature resistance of the organic protective layer is slightly lower.

According to the test results of Examples 2 and 16-19 and Comparative Example 2, it can be seen that when the sulfonic anhydride compound is added to the electrolyte of the battery, and the battery adopts a silicon negative electrode with a coating comprising $Me_yO_z$ (for example, $Al_2O_3$) with a thickness of about 10 nm to about 80 nm, the cycling capacity retention rate and the high-temperature resistance upon over discharge of the battery can be significantly improved. This may be because the sulfonic anhydride compound is reduced to form a protective layer on the negative electrode; the protective layer has a higher polarity and stably attaches to the $Me_yO_z$ coating, thereby protecting the negative electrode interface more stably. If the thickness of $Me_yO_z$ is too thin, the protection may be insufficient; if the coating is too thick, the conductivity is poor and the impedance is high, so that the performance is slightly deteriorated. In view of the above factors, the thickness of $Me_yO_z$ being is 20 nm to 50 nm can achieve a desired effect.

According to the test results of Example 2 and Example 20, it can be seen that when the sulfonic anhydride compound is added to the electrolyte of a battery, and when an additional $Me_yO_z$ protective layer (for example, $TiO_2$ layer with a thickness of 20 nm) is present on the surface of the silicon negative electrode of the battery, the negative electrode is better protected. This may be because the metal oxide $TiO_2$ also has a higher polarity, and the protective layer formed by the reduction of the sulfonic anhydride compound can stably attach to the surface of $TiO_2$ and thus protects it.

A comparison of Example 2 and Example 21 shows that when a suitable amount of sulfonic anhydride compound is added to the electrolyte and when the surface of the negative electrode is coated with a $Me_yO_z$ protective layer of an appropriate thickness, addition of carbon nanotubes to the negative electrode can further improve the conductive network in the negative electrode, thereby improving the uniformity the formed protective layer, reducing the impedance of the negative electrode, and thus further improving the cycle performance of the battery The foregoing descriptions are merely a few embodiments of the present application and are not intended to limit the present application in any manner.

Although the present application is described with reference to preferred embodiments, the embodiments are not intended to limit the present application.

Throughout the specification, references to "embodiment", "part of embodiments", "one embodiment", "another example", "example", "specific example" or "part of examples" mean that at least one embodiment or example of the present application includes specific features, structures, materials or characteristics described in the embodiment or example. Thus, the descriptions appear throughout the specification, such as "in some embodiments," "in an embodiment," "in one embodiment," "in another example," "in an example," "in is a particular example" or "for example," are not necessarily the same embodiment or example in the application. Furthermore, the specific features, structures, materials or characteristics in the descriptions can be combined in any suitable manner in one or more embodiments or examples.

Although the illustrative embodiments have been shown and described, it should be understood by those skilled in the art that the above embodiments cannot be interpreted as limitations to the present application, and the embodiments can be changed, substituted and modified without departing from the spirit, principle and scope of the present application.

The above-described embodiments of the present application are intended to be illustrative only. Numerous alternative embodiments may be devised by persons skilled in the art without departing from the scope of the following claims.

What is claimed is:

1. An electrochemical device comprising a positive electrode, a negative electrode and an electrolyte, wherein
the negative electrode comprises a negative electrode active material layer, comprising a negative electrode active material, wherein the negative electrode active material comprises a silicon-containing compound; and
the negative electrode active material further comprises, on the surface, a protective layer comprising a compound having an S=O bond,
wherein the silicon-containing compound is coated with a layer of $Me_yO_z$, wherein $1 \leq y \leq 2$, $1 \leq z \leq 3$, and Me is at least one selected from Ti, Al, Zr or Zn, and the layer of $Me_yO_z$ has a thickness of 5 nm to 100 nm; and
wherein the electrolyte comprises at least one sulfonic anhydride compound of Formula I or Formula II:

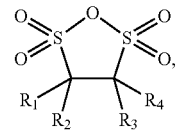

Formula I

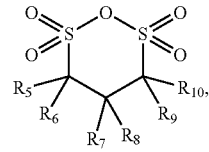

Formula II wherein $R_1$ to $R_{18}$ are each independently selected from hydrogen, halo, substituted or unsubstituted $C_1$-$C_7$ alkyl, substituted or unsubstituted $C_2$-$C_7$ alkenyl, substituted or unsubstituted $C_2$-$C_7$ alkynyl, substituted or unsubstituted $C_6$-$C_{10}$ aryl, substituted or unsubstituted $C_1$-$C_7$ alkoxy, or substituted or unsubstituted $C_6$-$C_{10}$ aryloxy; and
wherein when substituted, the substituent is halo or cyano; and
wherein the electrolyte further comprises a fluorinated additive, wherein the fluorinated additive comprises at least one of compound 13, compound 15 or compound 19; and the fluorinated additive accounts for no less than about 5 wt % based on a weight of the electrolyte;

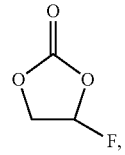

Compound 13

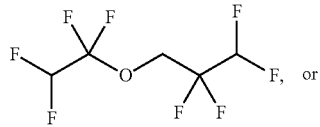

Compound 15

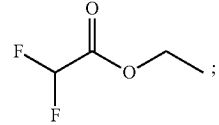

Compound 19 and wherein the electrolyte further comprises an additive A, wherein the additive A comprises at least one of vinylene carbonate, vinyl sulfate, butanedinitrile or adiponitrile, and wherein the additive A accounts for 0.1 wt % to 10 wt % based on a weight of the electrolyte.

2. The electrochemical device according to claim 1, wherein the sulfonic anhydride compound comprises at least one of:

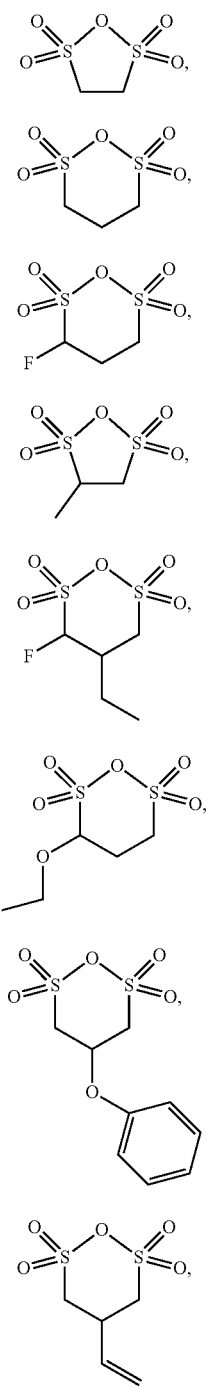

Compound 1

Compound 2

Compound 4

Compound 5

Compound 6

Compound 7

Compound 8

Compound 9

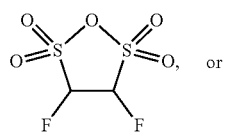

Compound 10

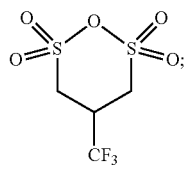

Compound 12 and wherein the sulfonic anhydride compound accounts for 0.01 wt % to 2 wt % based on a weight of the electrolyte.

3. The electrochemical device according to claim 1, wherein the silicon-containing compound accounts for 1 to 90 wt % based on a total weight of the negative electrode active material.

4. The electrochemical device according to claim 1, wherein the negative electrode active material layer comprises carbon nanotubes having a tube diameter of 1 nm to 10 nm, and a tube length of 1 micron to 50 microns.

5. The electrochemical device according to claim 4, wherein a weight ratio of the silicon-containing compound to the carbon nanotubes is 50 to 300, based on a total weight of the negative electrode active material.

6. The electrochemical device according to claim 1, wherein a load of the negative electrode active material layer on the negative electrode is 10 mg/cm² to 30 mg/cm².

7. The electrochemical device according to claim 1, wherein a weight ratio P of the fluorinated additive to the sulfonic anhydride compound meets: 1<P<50.

8. An electronic device, comprising an electrochemical device, wherein the electrochemical device comprises a positive electrode, a negative electrode and an electrolyte, wherein the negative electrode comprises a negative electrode active material layer, comprising a negative electrode active material, wherein the negative electrode active material comprises a silicon-containing compound; and the negative electrode active material further comprises, on the surface, a protective layer comprising a compound having an S=O bond, wherein the silicon-containing compound is coated with a layer of $Me_yO_z$, wherein 1≤y≤2, 1≤z≤3, and Me is at least one selected from TI, Al, Zr or Zn, and the layer of $Me_yO_z$ has a thickness of 5 nm to 100 nm, and wherein the electrolyte comprises at least one sulfonic anhydride compound of Formula I or Formula II:

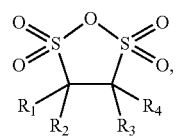

Formula I

Formula II

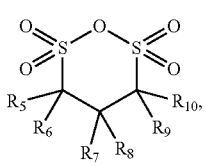

wherein $R_1$ to $R_{18}$ are each independently selected from hydrogen, halo, substituted or unsubstituted $C_1$-$C_7$ alkyl, substituted or unsubstituted $C_2$-$C_7$ alkenyl, substituted or unsubstituted $C_2$-$C_7$ alkynyl, substituted or unsubstituted $C_6$-$C_{10}$ aryl, substituted or unsubstituted $C_1$-$C_7$ alkoxy, or substituted or unsubstituted $C_6$-$C_{10}$ aryloxy; and wherein when substituted, the substituent is halo or cyano; and wherein the electrolyte further comprises a fluorinated additive, wherein the fluorinated additive comprises at least one of compound 13, compound 15 or compound 19; and the fluorinated additive accounts for no less than about 5 wt % based on a weight of the electrolyte;

Compound 13

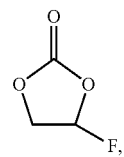

Compound 15

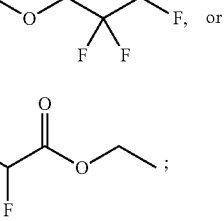

Compound 19

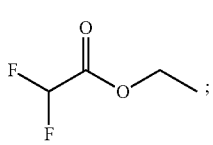

and wherein the electrolyte further comprises an additive A, wherein the additive A comprises at least one of vinylene carbonate, vinyl sulfate, butanedinitrile or adiponitrile, and wherein the additive A accounts for 0.1 wt % to 10 wt % based on a weight of the electrolyte.

9. The electronic device according to claim 8, wherein the sulfonic anhydride compound comprises at least one of:

Compound 1

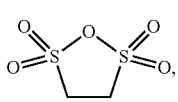

Compound 2

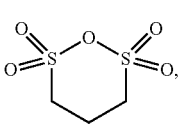

Compound 4

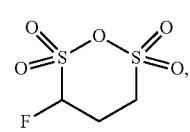

Compound 5

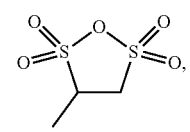

Compound 6

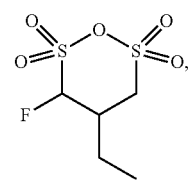

Compound 7

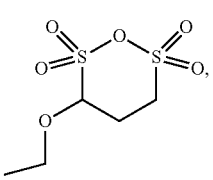

Compound 8

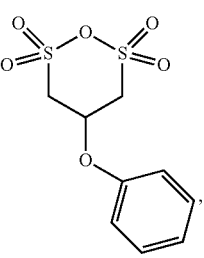

Compound 9

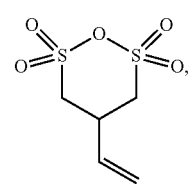

Compound 10

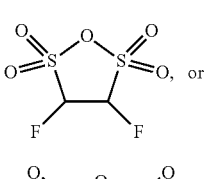

Compound 12

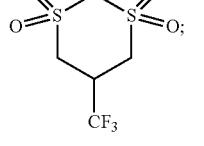

and wherein the sulfonic anhydride compound accounts for 0.01 wt % to 2 wt % based on a weight of the electrolyte.

10. The electronic device according to claim 8, wherein the silicon-containing compound accounts for 1 to 90 wt % based on a total weight of the negative electrode active material.

11. The electronic device according to claim 8, wherein the negative electrode active material layer comprises carbon nanotubes having a tube diameter of 1 nm to 10 nm, and a tube length of 1 micron to 50 microns.

12. The electrochemical device according to claim 1, wherein each of Formula I, II, and III contains more than 5 carbon atoms in total.

13. The electrochemical device according to claim 1, wherein the fluorinated additive comprises at least one of the fluorinated ether having 2 to 7 carbon atoms or the fluorinated carboxylate having 2 to 6 carbon atoms.

* * * * *